United States Patent [19]

Kasai et al.

[11] Patent Number: 4,720,792
[45] Date of Patent: Jan. 19, 1988

[54] METHOD AND APPARATUS FOR CONTROLLING OPERATION OF A THROTTLE

[75] Inventors: Hitoshi Kasai, Kawasaki; Makoto Uriuhara, Yokohama, both of Japan

[73] Assignees: Fujitsu Limited, Kawasaki; Isuzu Motors Limited, Tokyo, both of Japan

[21] Appl. No.: 674,833

[22] Filed: Nov. 26, 1984

[51] Int. Cl.$^4$ .................. B60K 41/08; G06F 15/50; G05D 17/02
[52] U.S. Cl. .................. 364/424.1; 74/866
[58] Field of Search .................. 364/424.1; 74/866

[56] References Cited

U.S. PATENT DOCUMENTS

| | | | |
|---|---|---|---|
| 4,490,790 | 12/1984 | Shinoda | 364/424.1 |
| 4,517,646 | 5/1985 | Magnusson et al. | 364/424.1 |
| 4,523,281 | 6/1985 | Noda et al. | 364/424.1 |
| 4,551,802 | 11/1985 | Smyth | 364/424.1 |

Primary Examiner—Felix D. Gruber
Attorney, Agent, or Firm—Staas & Halsey

[57] ABSTRACT

A method for controlling operation of a throttle valve in an automatic transmission system for automobiles using a microcomputer, including the steps of: (a) detecting an accelerator position, an engine rotational speed, a clutch stroke, a change lever position, an input shaft rotational speed, and a transmission gear position by a transmission gear position sensor; (b) comparing the data determined in step (a) with a predetermined transmission map and a throttle valve operation speed map each stored in a memory of the microcomputer, and calculating the throttle valve operation speed for various driving conditions; and (c) controlling the operation of the throttle valve through a throttle actuator based on a control signal generated from the throttle valve operation speed map. An apparatus for controlling the operation of a throttle valve in an automatic transmission system for automobiles, including a device for detecting operation data for automobiles, a device for comparing the detected data with a predetermined transmission map and a throttle valve operation speed map, a device for determining the throttle valve operation speed based on the compared data, and a device for controlling the operation of a throttle valve based on a control signal generated in accordance with the throttle valve operation speed map.

11 Claims, 8 Drawing Figures

METHOD AND APPARATUS FOR CONTROLLING OPERATION OF A THROTTLE

BACKGROUND OF THE INVENTION

1. Field of the Invention

The present invention relates to a method and apparatus for controlling operation of a throttle valve, based on an accelerator pedal signal, in a vehicle having an automatic transmission system including an electric control circuit, such as a microcomputer.

The present invention can automatically control the operation of a throttle valve in accordance with predetermined control maps stored in a read-only memory (ROM) in the microcomputer, thereby allowing easy driving under all driving conditions.

2. Description of the Prior Art

As is well known, it is troublesome for a driver, especially an unskilled driver, to operate a clutch pedal, accelerator pedal, and change lever all at once. It is troublesome and tiring even for a skilled driver to operate the same over long distances or start-and-stop traffic.

Recently, increasing use has been made of automatic transmission systems using so-called torque converters. These eliminate the awkward clutch operation and automate the gear change operation. But using a torque converter, the driver need only operate the accelerator pedal and brake pedal. Therefore, even an unskilled driver can easily drive under all driving conditions.

While an automobile equipped with a torque-converter type automatic transmission offers many advantages in terms of driveability, it requires more careful maintenance and costs more due to the many complex mechanisms incorporated therein. For example, due to the need for precise control for obtaining smooth driving equal to that offered by a manual transmission, it requires a large oil pressure circuit for controlling the transmission mechanism.

Also, as opposed to a manual transmission car where the engine power is transmitted to the drive wheels via a mechanical coupling, an automobile having an automatic transmission uses fluid coupling for transmission of engine power. As a result, it suffers from inferior transmission efficiency of the engine power and thus poorer fuel consumption efficiency. Moreover, slip loss occurs during transmission of power, making it difficult to obtain the desired acceleration along with the operation of the accelerator pedal.

Moreover, when braking, the driver must frequently operate the brake pedal due to the somewhat poor effect of engine braking.

SUMMARY OF THE INVENTION

The primary object of the present invention is to provide an automatic transmission system enabling automatic clutch engagement and disengagement and gear change by using a microcomputer.

Another object of the present invention is to provide a method and apparatus for controlling the operation of a throttle valve based on an accelerator pedal signal in an automatic transmission system using a microcomputer.

Still another object of the present invention is to provide a method and apparatus enabling highly precise, smooth, automatic control of the operation of a throttle valve under predetermined control maps stored in a ROM for various driving conditions.

In accordance with the present invention, there is provided a method for controlling operation of a throttle valve in an automatic transmission system for automobiles using a microcomputer, including the steps of: detecting an accelerator position by an accelerator position sensor, an engine rotational speed by an engine speed sensor, a clutch stroke by a clutch stroke sensor provided on a clutch actuator and a clutch position sensor provided near a clutch, a change lever position by a lever position sensor, an input shaft rotational speed by an input shaft rotational speed sensor, and a transmission gear position by a transmission gear position sensor; comparing each sensor data with contents of a predetermined transmission map and a throttle valve operation speed map, stored in the memory of the microcomputer and calculating the throttle valve operation speed for various driving conditions; and controlling the operation of the throttle valve through a throttle actuator based on a control signal generated from the throttle valve operation speed map.

Moreover, there is provided, an apparatus for controlling operation of a throttle valve in an automatic transmission system for automobiles using a microcomputer, including: means for detecting an accelerator position, an engine rotational speed, a clutch stroke, a change lever position, an input shaft rotational speed, and a transmission gear position; means for comparing each detected data with data from a predetermined transmission map and a throttle valve operation speed map; means for calculating the throttle valve operation speed based on the compared data; and means for controlling the operation of the throttle valve through a throttle actuator based on a control signal generated from the throttle valve operation speed map.

In accordance with the present invention, driving is facilitated under all driving conditions and driveability improved compared with the conventional mechanical linkage of the accelerator pedal and throttle valve. Moreover, the automatic throttle control of the present invention facilitates the use of dry-type single-plate clutches with sliding-mesh-type automatic transmissions.

DESCRIPTION OF THE PREFERRED EMBODIMENTS

A method and apparatus for controlling operation of a throttle valve in an automatic transmission system will now be explained in detail.

Figure 1:
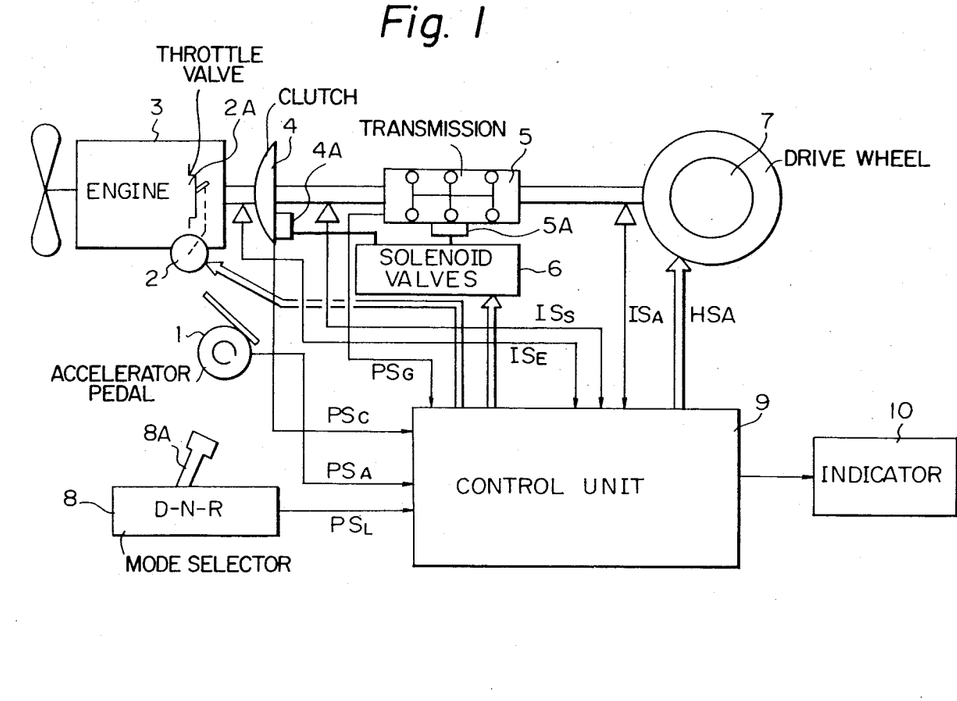
FIG. 1 is a schematic block diagram of a microcomputer-controlled automatic transmission system provided in an automobile.

FIG. 1 is a schematic block diagram of an electronically controlled (computer controlled) automatic transmission system provided in an automobile. The present invention applies to an automobile having the construction shown in FIG. 1, i.e., having a construction in which usual clutches (dry-type single-plate clutches) and sliding-mesh-type transmission gears are actuated by actuators (clutch actuator and transmission actuator) under the control of a control unit, a conventional torque converter or auxiliary subtransmission is not used.

Referring to FIG. 1; reference numeral 1 is an accelerator pedal; 2 a throttle actuator for adjusting a throttle valve 2A; 3 an engine; 4 a clutch; 5 transmission gears; 6 solenoid valves for driving a clutch actuator 4A and a transmission actuator 5A; 7 a drive wheel; 8 a mode selector, provided with a select lever 8A, for manually selecting a drive mode which as drive (D), neutral (N), and reverse (R); 9 a control unit, constituted by a microcomputer, for controlling the throttle actuator 2 and the solenoid valves 6 and for producing a hill start aid output signal (HSA) which maintains brake application until the accelerator pedal is depressed; and 10 an indicator for displaying the present gear position of the transmission 5.

The control unit 9 or microcomputer receives, at its input ports, a lever position signal $PS_L$ from the selector 8, an accelerator position signal $PS_A$ from the accelerator pedal 1, an engine speed indication signal $IS_E$ from the output of the engine 3, a clutch position signal $PS_C$ from the clutch 4, a gear position signal $PS_G$ from the transmission 5, a rotational input-shaft speed indication signal $IS_S$, and an automobile speed indication signal $IS_A$. Note that the above-mentioned input signals $PS_L$, $PS_A$, $IS_E$, $PS_C$, $PS_G$, and $IS_A$ are detected by and produced from individual widely known sensors.

Figure 5:
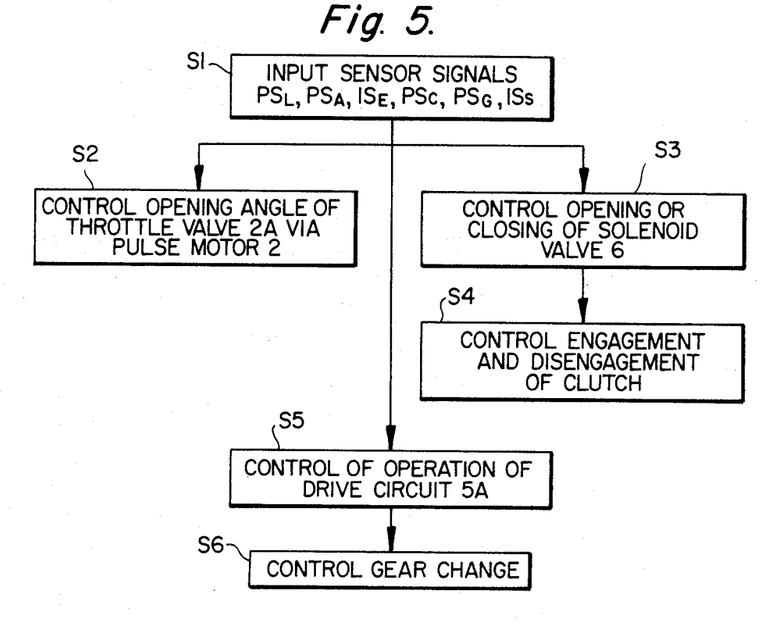
FIGS. 5-8 illustrate the operations performed by the control unit 9.

The control unit 9 receives (S1) and processes the individual input signals from these sensors to produce output signals at the respective output ports. The output signals include a signal for operating (S2) the throttle valve 2A through the throttle valve actuator 2B so as to control the engine speed and for operating (S3 and S4) the solenoid valves for engagement or disengagement of the clutch 4 through the clutch actuator 4A and gear changes (S5 and S6) in the transmission 5 through the transmission actuator 5A.

Figure 6:
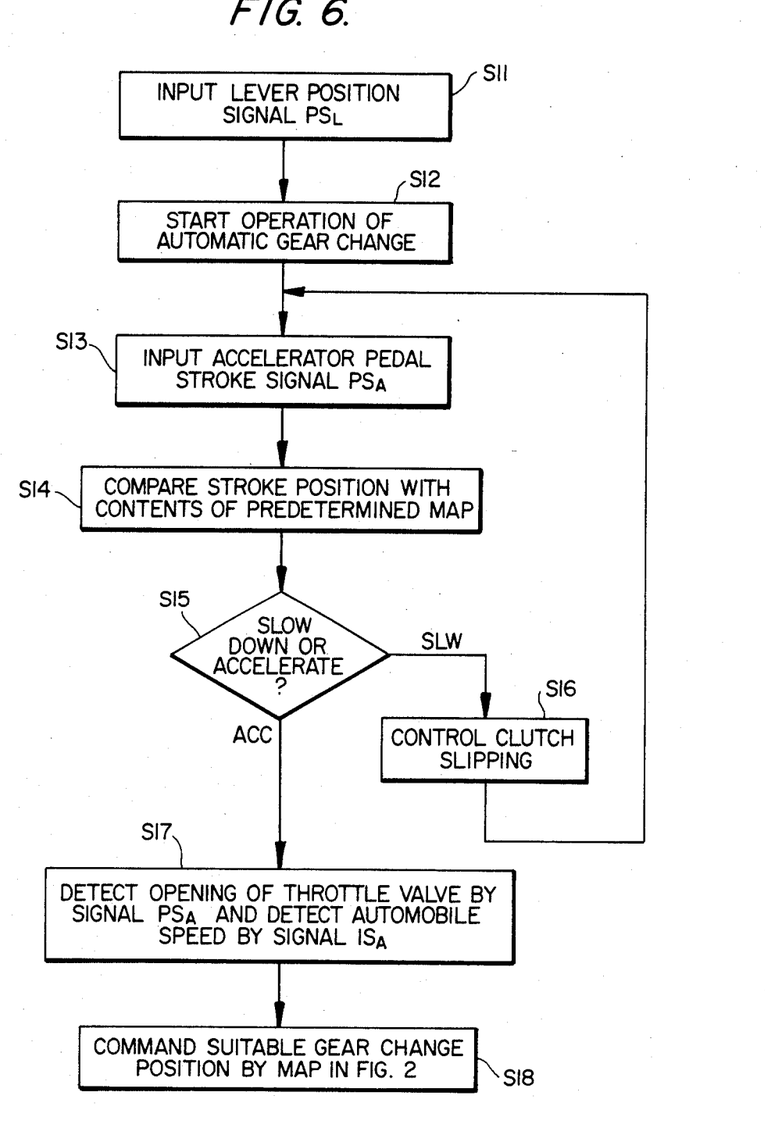

When the select lever 8A is set to the drive (D) position, the lever position signal $PS_L$ is transmitted (S11) to the control unit 9, whereupon the control unit 9 starts (S12) the control of the automatic gear change through the solenoid valves 6 and the transmission actuator 5A. When the driver depresses (S13) the accelerator pedal 1, the control unit compares (S14) the actual stroke of the accelerator pedal 1 with the predetermined stroke of the accelerator pedal stored in the map (ROM) based on the accelerator position signal $PS_A$. The ROM includes values in appropriate units for the relevant sensor. The control unit judges (S15) whether the automobile is to travel at a slow normal speed or to accelerate to a high speed in a kick down mode. When the control unit 9 judges that the automobile is to travel at a slow speed, it actuates (S16) the clutch actuator 4A through the solenoid valves 6 so as to place the clutch 4 into the clutch slip condition. When the control unit judges that the automobile is to start up and accelerate, it first completely disengages the clutch 4 by the clutch actuator 4A and changes the transmission gears 5 to the desired position by the transmission actuator 5A through the solenoid valves. When the gears are changed (S18) in the transmission, the control unit 9 detects (S17) the throttle valve angle, i.e., throttle valve opening or closing angle, based on the accelerator position signal $PS_A$ and detects the automobile speed based on the automobile speed indication signal $IS_A$ in accordance with a transmission map shown in FIG. 2, and re-engages the clutch.

Figure 2:
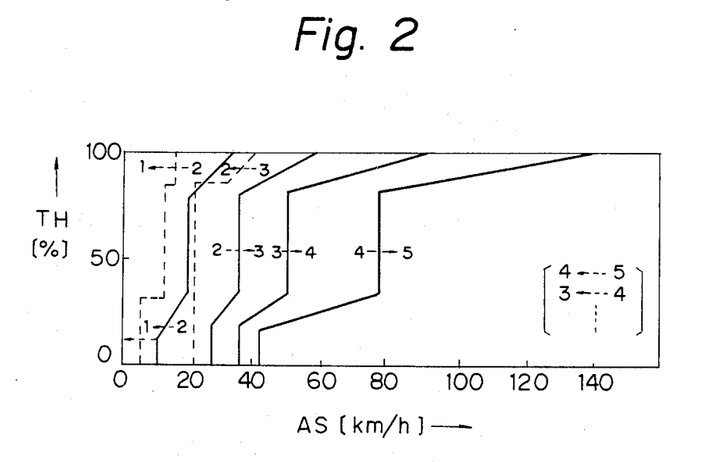
FIG. 2 is a map used for determining a suitable gear position for a predetermined automobile speed.

FIG. 2 is a schematic diagram of a map used for determining a suitable gear position based on the automobile speed and the throttle valve angle. This map is stored in a ROM. In FIG. 2 the ordinate TH indicates the throttle valve angle in percent, while the abscissa AS indicates the automobile speed in kilometers per hour. The map determines the best gear position for the travel of the automobile in accordance with the throttle valve angle and the automobile speed. A TH of 100 percent represents a state in which the throttle valve is fully opened, while a TH of 0 percent represents a state in which the throttle valve is closed. In the map of FIG. 2, reference numerals 1, 2, 3, 4, and 5 indicate individual gear positions. The curves indicated by solid lines represent gear change boundaries during acceleration, while the curves indicated by broken lines represent gear change boundaries during deceleration. In the drawings, arrows indicate the direction of gear change, for example, 4←5 indicates a gear change from the fifth gear position to the fourth position. Curves indicating gear change boundaries for shifts from the fifth position to fourth position and from the fourth position to third position are omitted to simplify the drawing.

As can be understood from the map, the gear position can be immediately determined by the throttle valve angle, i.e., load condition of the engine 3 and the automobile speed. There is a difference between a gear change during acceleration (change from a low gear position to a high gear position, indicated by solid lines) and a gear change during deceleration (change from a high gear position to a low gear position, indicated by broken lines), for example, 2→3 of the solid line and 2←3 of the broken line. This is to prevent frequent automatic gear changes and thus unstable travel of the automobile when the automobile is traveling near the solid lines or broken lines. In a usual automatic transmission system, a gear change is performed in accordance with the map shown in FIG. 2. The same is true of the automatic transmission of the present invention.

Figure 7:
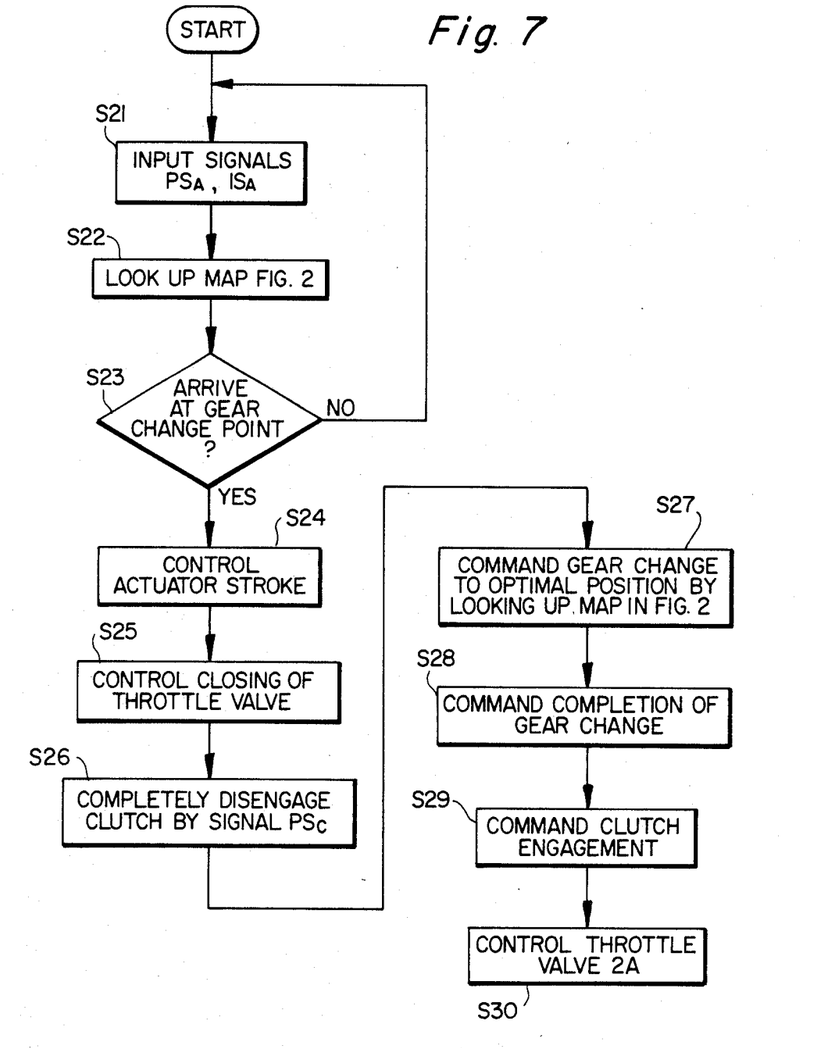

The control unit 9 controls the gear change as follows. Upon reaching (S21-S23) gear change point determined by the accelerator position signal $PS_A$ and the automobile speed indication signal $IS_S$ in reference to the transmission map of FIG. 2, the control unit 9 first controls (S24) the clutch actuator 4A by the solenoid valves 6 and closes (S25) the throttle valve 2A by the throttle actuator 2 to prevent revving of the engine due to no load—regardless of the accelerator pedal position. It then disengages (S26) the clutch 4 by the clutch actuator 4A and detects complete clutch disengagement by the clutch position signal $PS_C$. When this is detected, it activates (S27) the transmission actuator 5A to select the optimal gear position according to the transmission map shown in FIG. 3B. When the gear change operation is completed (S28), the control unit 9 activates (S29) the clutch actuator 4A to re-engage the clutch 4 through the solenoid valves. During this procedure, it controls (S30) the throttle valve 2A by the throttle actuator 2 so as to obtain the suitable throttle valve angle corresponding to the accelerator pedal position.

Figure 3A:
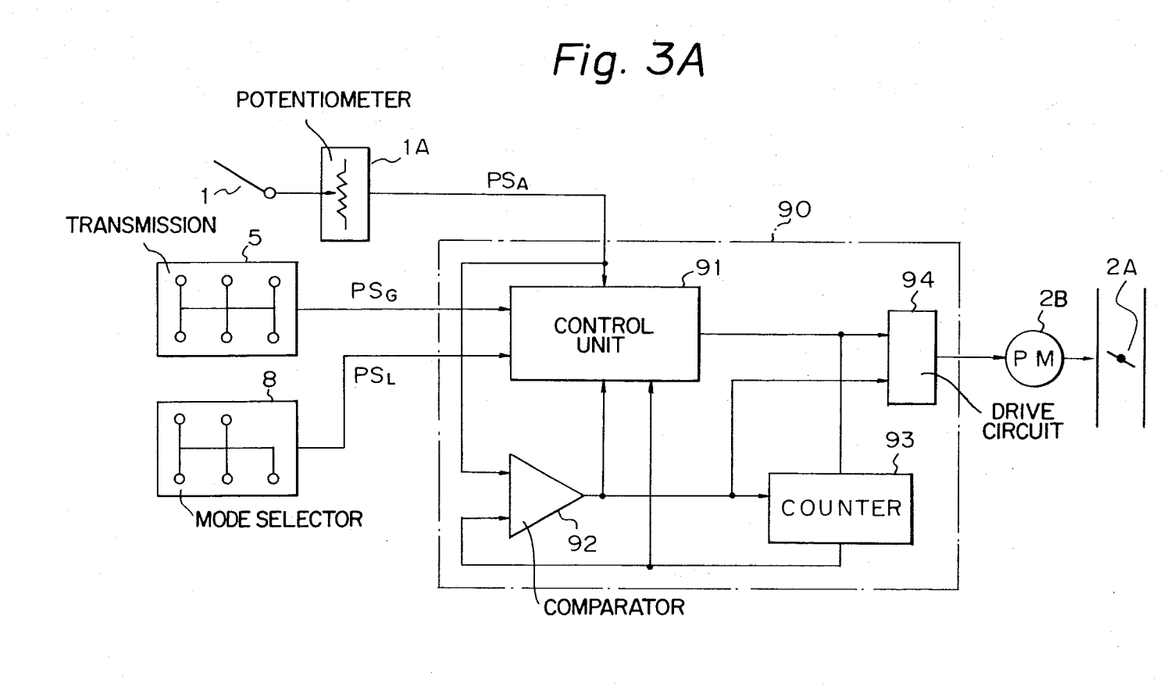
FIG. 3A is a schematic block diagram of a throttle valve control unit included in a control unit.
Figure 3B:
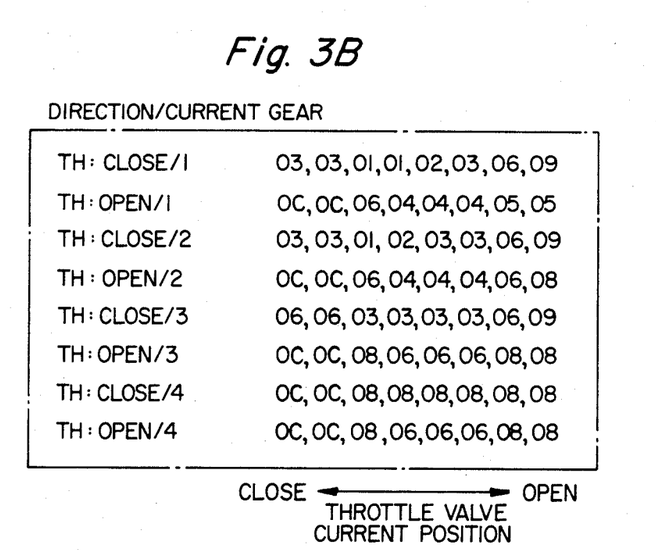
FIG. 3B is a map of the contents of the ROM in the control unit.

FIG. 3A is a schematic block diagram of a throttle valve control unit constituting part of the control unit 9. In FIG. 3A the throttle valve control unit 90 includes a control unit 91 having a ROM for storing throttle valve operation speed map, a comparator 92, a counter 93, and a drive circuit 94. The map is used for determining the optimal throttle valve operation speed for various traveling conditions and driver preferences and has the following curves as illustrated in FIG. 3B where the direction of throttle movement and current gear are indicated in the leftmost column; in the right group of 8 columns the rightmost column is for a current throttle position of 90% open, while the leftmost column is for 90% closed; and the contents of the rightmost columns indicate, in hexidecimal notation, the number of pulses produced every 25 msec.:

1. A curve for reducing the throttle valve operation speed at throttle positions where engine characteristics result in large torque fluctuations.

2. A curve for increasing or reducing the throttle valve operation speed in accordance with depression or release of the accelerator pedal 1, i.e., increasing the throttle valve operation speed when the throttle valve is opening and reducing it when the throttle valve is closing.

3. A curve for increasing or reducing the throttle valve operation speed in accordance with gear position of the transmission 5, i.e., increasing the throttle valve operation speed at the high gear positions which require small engine torque and reducing the throttle valve operation speed at the low gear positions which require large engine torque.

4. A curve for increasing the throttle valve operation speed to increse the speed of response in accordance with the gear position, for example, power mode or engine brake mode, of the select lever 8A.

5. A curve for increasing the throttle valve operation speed to increase the speed of response in accordance with the stroke of the accelerator pedal 1 when quickly accelerating.

Figure 8:
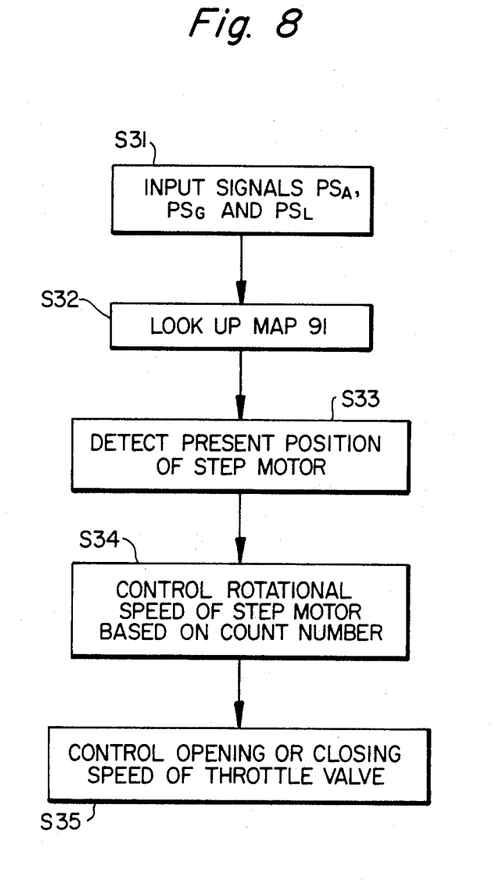

In FIG. 3A, a potentiometer 1A, provided with the accelerator pedal 1 as a detection means, generates (S31) the accelerator position signal $PS_A$ indicating the current stepped stroke of the accelerator pedal 1. The control unit 91 compares (S32) the signal $PS_A$ with the throttle valve operation speed map. The gear position signal $PS_G$ indicating the gear position of the transmission gear 5 is also compared with the contents of the map, as is the lever position signal $PS_L$ indicating the lever position of the select lever 8A. The comparison of the gear position and direction of movement with left column map contents indicates a row in the map. The present throttle position is used as an index along the row to determine the number of movement pulses to apply to the motor 2B. A throttle motor is connected to a throttle 2A where this throttle motor is a pulse motor 2B. A throttle valve angle proportional to the pulse count is obtained (S33) by the operation of the pulse motor 2B.

The control unit 91 outputs a control signal indicating the optimal throttle valve operation speed in accordance with parameters determined by various signals. A control signal consisting of digital pulses applied to the drive circuit 94 is provided to the pulse motor 2B after desired amplification. Table look-up of the optimal throttle valve operation speed in the control unit 91 is performed during a predetermined constant period. The angles to be rotated, i.e., pulse counts to the pulse motor 2B are supplied (S34 and S35) by the control signal including the optimal throttle valve operation speed.

When pulse counts are applied to the drive circuit 94, the drive circuit 94 generates a drive pulse to the pulse motor 2B and causes a corresponding rotation of the pulse motor 2B. The direction of rotation of the pulse motor 2B is determined by the output signal supplied by the comparator 92. The counter 93 indicates the rotational position of the pulse motor 2B and accumulates pulse counts supplied by the control unit 91. The counter 93 adds pulse counts when the output signal of the comparator 92 indicates the opening direction of the throttle valve and subtracts pulse counts when the output signal of the comparator 92 indicates the closing direction of the throttle valve. The comparator 92 judges the opening or closing direction of the throttle valve and compares counts of predetermined throttle valve angle determined by the accelerator pedal position with counts determined by the counter 93. When the former is larger than the latter, the comparator 92 commands the drive circuit 94 to rotate toward the opening direction, while when the former is smaller than the latter, the comparator 92 commands the drive circuit 94 to rotate toward the closing direction.

Figure 4:
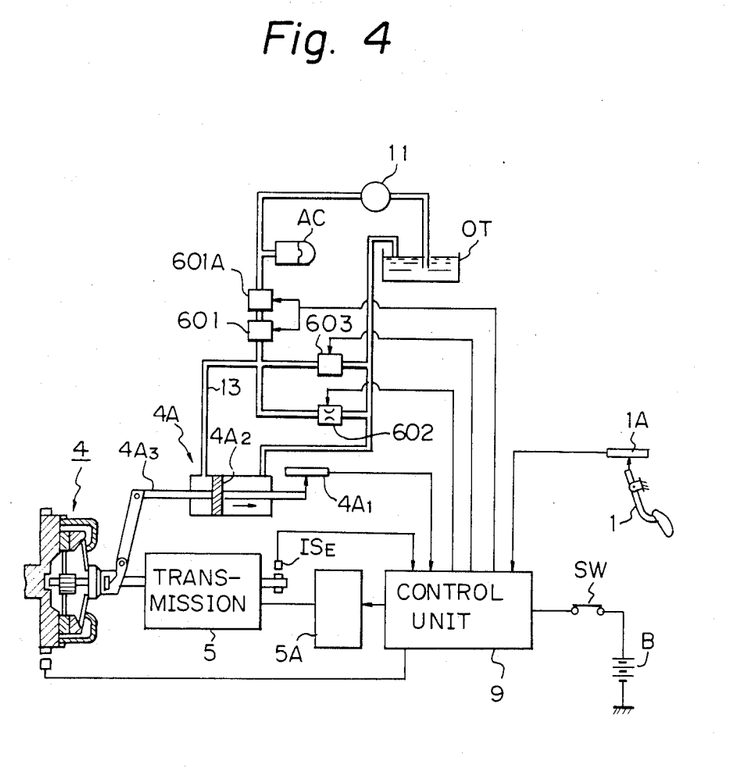
FIG. 4 is a schematic block diagram of a hydraulic control circuit including solenoid valves controlled by the control unit shown in FIG. 1.

FIG. 4 is a schematic block diagram of a hydraulic control circuit including solenoid valves controlled by the control unit shown in FIG. 1. The control of this circuit is performed at the same time as the above-mentioned control of operation of the throttle valve using the control unit.

Referring to FIG. 4, the clutch 4 is constituted by a clutch pressure plate, clutch disk, diaphragm spring, clutch release bearing, clutch release lever, clutch shaft, and lever. Reference numerals 601, 601A, 602, and 603 are solenoid valves in the solenoid valve group 6; B a battery, SW a power switch associated with an ignition switch; AC an accumulator; and OT an oil tank.

The clutch 4 is controlled by controlling the operation of the solenoid valves 601, 601A, 602, and 603 through the clutch actuator 4A using the control unit 9. The control unit 9 consists of a microcomputer storing a program with respect to driving conditions. When the solenoid valves 601 and 601A, for example, are actuated by the control unit 9, pressurized fluid is supplied to the oil cylinder (clutch actuator) 4A from the oil pump 11. The piston $4A_2$ of the oil cylinder 4A is thus moved toward the right as indicated by the arrow line to disengage the clutch disk. When the solenoid valves 602 and 603 are actuated by the control unit 9, the pressurized fluid is exhausted from the oil cylinder 4A. The piston $4A_2$ thus moves in the reverse direction due to the action of a return spring (not shown) to reengage the clutch disk.

What is claimed is:

1. A method for operating a throttle valve in a vehicle having an automatic transmission system using a microcomputer, comprising the steps of:
   (a) detecting an accelerator position with an accelerator position sensor, an engine rotational speed with an engine speed sensor, a clutch stroke with a clutch stroke sensor provided on a clutch actuator and a clutch position sensor, a change lever position with a lever position sensor, an input shaft rotational speed with an input shaft rotational speed sensor, and a transmission gear position with a transmission gear position sensor;
   (b) comparing the data detected in step (a) with contents of a predetermined transmission map and a predetermined throttle valve operation speed map stored in a memory of said microcomputer, and determining the throttle valve operating speed for various driving conditions; and (c) controlling the operation of the throttle valve through a throttle actuator based on a control signal generated in accordance with the throttle valve operating speed determined in step (b).

2. A method as claimed in claim 1, wherein further comprising the step of determining a suitable gear position based on automobile speed and throttle valve angle in accordance with the contents of said predetermined transmission map.

3. A method as claimed in claim 1, wherein step (b) further comprises calculating the throttle valve operation speed based on an accelerator position, gear position, and select level position in accordance with the contents of said throttle valve operation speed map.

4. A method as claimed in claim 1, further comprising the step of storing said transmission map and throttle valve operation speed map in a ROM.

5. A method as claimed in claim 1, wherein step (b) further comprises controlling said throttle valve operation speed based on the contents of said transmission map and throttle valve operation speed map in accordance with the various traveling conditions of said automobile detected in step (a).

6. A method as claimed in claim 1, wherein said throttle valve operation is controled in accordance with the stepped stroke of an accelerator pedal detected by said accelerator position sensor and in accordance with the engine rotational speed detected by said engine speed sensor.

7. An apparatus for controlling operation of a throttle valve in a vehicle having an automatic transmission system, comprising:
sensor means for detecting an accelerator position, an engine rotational speed, a clutch stroke, a change lever position, an input shaft rotational speed, and a transmission gear position; and
microcomputer means for controlling operation of the throttle valve by comparing the detected data with contents of a predetermined transmission map and a predetermined throttle valve operation speed map, determining a throttle valve operating speed based on the compared data, and controlling the operation of the throttle valve through a throttle actuator based on a control signal generated in accordance with the throttle valve operating speed.

8. An apparatus as claimed in claim 7, wherein said microcomputer includes a ROM for storing said transmission map and throttle valve operation speed map.

9. An apparatus as claimed in claim 7 wherein said microcomputer means includes a ROM for storing said throttle valve operation speed map, a comparator, a counter, and a drive circuit.

10. A method for operating a throttle valve in a vehicle having an automatic transmission system using a microcomputer, comprising the steps of:

(a) detecting operating data for the vehicle;

(b) comparing the operating data detected in step (a) with contents of a predetermined transmission map and a predetermined throttle valve operation speed map;

(c) determining a throttle valve operating speed in accordance with the comparison of the operating data with the contents of the transmission map and the throttle valve operation speed map; and (d) controlling the operation of the throttle valve in accordance with the throttle valve operating speed determined in step (c).

11. An apparatus for controlling the operation of a throttle valve in a vehicle having an automatic transmission system, comprising:
sensor means for detecting operating data for the vehicle; and
microcomputer means for controlling the throttle valve by comparing the operating data with data from a predetermined transmission map and a predetermined throttle valve operation speed map, determining a throttle valve operating speed based on the comparison of the operating data with the transmission map and the throttle valve operation speed map, and controlling the operation of the throttle valve in accordance with the throttle valve operating speed.

* * * * *